United States Patent [19]

Bemis et al.

[11] 4,332,651

[45] Jun. 1, 1982

[54] AC ETCHING OF ALUMINUM CAPACITOR FOIL

[75] Inventors: Richard A. Bemis, Clarksburg, Mass.; Clinton E. Hutchins, Pownal, Vt.; Edward J. Markland, North Adams; Mulk R. Arora, Williamstown, both of Mass.

[73] Assignee: Sprague Electric Company, North Adams, Mass.

[21] Appl. No.: 265,296

[22] Filed: May 20, 1981

[51] Int. Cl.³ .............................. C25F 3/04; C25F 3/14
[52] U.S. Cl. .............................. 204/129.9; 204/129.4; 204/129.95
[58] Field of Search .............. 204/129.9, 129.95, 129.4

[56] References Cited

U.S. PATENT DOCUMENTS

| | | | |
|---|---|---|---|
| 2,336,846 | 12/1943 | Clark | 204/141 |
| 2,598,043 | 5/1952 | Eichner | 148/6.27 |
| 3,249,523 | 5/1966 | Post et al. | 204/141 |
| 3,887,447 | 6/1975 | Sheasby et al. | 204/129.4 |
| 4,276,129 | 6/1981 | Kanzki et al. | 204/58 |

Primary Examiner—T. Tufariello
Attorney, Agent, or Firm—Connolly and Hutz

[57] ABSTRACT

Aluminum capacitor foil is etched in a bath at 30° to 45° C. containing 0.5 to 1.8 M hydrochloric acid, 0.05 to 0.3 M phosphoric acid, 0.2 to 0.5 aluminum chloride and 0.09 to 1.0 M alkali or alkaline earth metal chloride while being subjected to alternating current at 15 to 36 Hz frequency.

8 Claims, 1 Drawing Figure

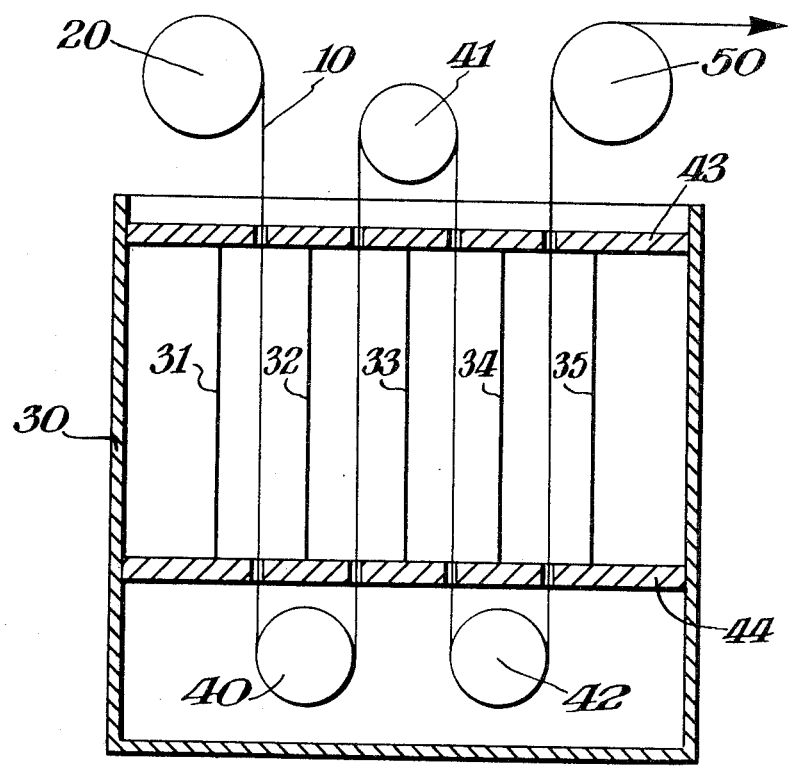

AC ETCHING OF ALUMINUM CAPACITOR FOIL

BACKGROUND OF THE INVENTION

This invention relates to the etching of aluminum foil for electrolytic capacitors using alternating current and a chloride electrolyte containing not only phosphoric acid but also alkali or alkaline earth metal chloride.

AC etching has been used to produce aluminum articles such as lithographic plates and capacitor foil. It also has been used to electropolish aluminum articles prior to metal plating.

The prior art has discussed the difficulties in obtaining an even or uniform etch structure and has overcome these difficulties in a variety of ways, e.g., interrupting the etch process to apply protective coatings, carrying out the etch process in stages of different degrees of aggressiveness, and using additives in the electrolyte bath to control pit size or to increase mechanical strength of the foil. Another problem has been to prevent the precipitation of aluminum hydroxide, formed during etching, on or into the etched surfaces.

The resolution of these problems has led to processes in which the etch conditions are carefully controlled to provide the desired increase in surface area and, particularly for capacitor foil, little change in mechanical strength. Such a process is described by M. R. Arora and J. J. Randall, Jr., in copending application Ser. No. 187,241 filed Sept. 15, 1980 now U.S. Pat. No. 4,279,714 that uses an electrolyte containing hydrochloric acid, phosphate ion and aluminum chloride.

SUMMARY OF THE INVENTION

A process for etching aluminum capacitor foil utilizes AC current to give a uniform etch structure while maintaining foil strength and is less sensitive to process changes. The process also provides an etched foil with higher capacitance than closely related prior art processes.

The above results are obtained by using an etchant solution containing hydrochloric acid, phosphoric acid, aluminum chloride, and an alkali or alkaline earth metal chloride at 30° to 45° C. and an alternating current frequency of 15 to 36 Hz.

As described by Arora and Randall in copending application Ser. No. 187,241 filed Sept. 15, 1980, the presence of phosphate in a chloride etchant results in a more desirable etch density (number of etch sites per unit area of foil surface) while the aluminum chloride is present to prevent wide variations in aluminum ion concentration. The hydrochloric acid is the main etchant and also provides the strongly acidic conditions necessary to prevent precipitation of aluminum hydroxide on the foil.

It has now been found that when an alkali or alkaline earth chloride is added to the electrolyte used by Arora and Randall, capacitance of the etched foil is increased, and the process also becomes easier to control as it is less sensitive to process fluctuations.

The concentration of the hydrochloric acid in the etchant used in the present invention is 0.5 to 1.8 M. Concentrations of significantly less than 0.5 M were found to lead to foil perforation rather than surface etching, while concentrations of significantly above 1.8 M leads to loss of capacitance and foil thinning. The concentration of the aluminum chloride is 0.2 to 0.5 M to prevent wide variations in the aluminum ion concentration particularly during start-up and also when adding make-up solutions. The phosphoric acid concentration is maintained at 0.05 to 0.3 M to give the desired etch density.

The alkali or alkaline earth metal chloride content is maintained at 0.09 to 1.0 M to give the increased capacitance and process control. At concentrations of above 1.0 M, capacitance began to decrease.

With this electrolyte, lower current density can be used and still obtain the desired number of etch sites. The current density is maintained at 1.0 to 3.0 A/in$^2$ in the present process. Other process variables are slightly lower with this electrolyte than with prior art processes. The temperature is maintained at 30° to 45° C., and the frequency of the alternating current is maintained at 15 to 36 Hz as this range gave optimum capacitance.

BRIEF DESCRIPTION OF THE DRAWING

The sole FIGURE shows foil being etched by the process of the present invention.

DESCRIPTION OF THE PREFERRED EMBODIMENTS

Aluminum foil 10 is passed over roll 20 into etching tank 30 between insulated electrodes 31 and 32, under roll 40 and between electrodes 32 and 33, over roll 41 and between electrodes 33 and 34, under roll 42 and between electrodes 34 and 35, and out of tank 30 and over roll 50. The electrodes are carried by insulated frames 43 and 44 that have openings for passage of foil 10. More electrodes and rolls may be used than shown.

The etched foil obtained by the method of the present invention has a metallic core, that gives good mechanical properties and low-temperature capacitance retention.

Because of cost considerations, the alkali and alkaline earth metal chlorides are generally sodium, potassium, or magnesium chloride with sodium chloride preferred. These materials not only increase the capacitance of the foil but also act to make the process less sensitive to process fluctuations, e.g., temperature, frequency, current density, and electrolyte composition.

In the example below, soft 2.9 mil foil of 99.99% purity was used. Hard foil can be etched by this process, as can foil of different purity, but satisfactory capacitance is obtained without resorting to hard foil.

EXAMPLE 1

Using sodium chloride as the alkali metal, the effects of temperature, frequency, current density, and electrolyte composition were studied. In Table 1a below, representative results were presented. The frequency was 20 Hz. Current density is in amps/in$^2$ (A/in$^2$), foil thickness in mils after etching, capacitance is capacitance/in$^2$ given in microfarads/in$^2$, $\mu$F/in$^2$, and temperature is in °C.

TABLE 1a

| Electro-lyte | °C. | A/in$^2$ | mils | wt. loss % | Capacitance 10V | 30V |
|---|---|---|---|---|---|---|
| 1 | 30 | 1.0 | 2.85 | 32.5 | 187 | 65.5 |
| 1 | 30 | 2.5 | 2.50 | 36.9 | 115 | 35.3 |
| 1 | 37 | 1.0 | 2.82 | 35.8 | 187 | 66.7 |
| 1 | 37 | 2.5 | 2.63 | 38.7 | 170 | 59.6 |
| 2 | 30 | 1.0 | 2.82 | 35.2 | 226 | 75.9 |
| 2 | 30 | 2.5 | 2.73 | 36.8 | 235 | 71.6 |
| 2 | 37 | 1.0 | 2.80 | 37.6 | 223 | 67.9 |
| 2 | 37 | 2.5 | 2.15 | 44.4 | 134 | 27.1 |
| 3 | 39 | 2.4 | 2.80 | 31.5 | 251 | 88.7 |

TABLE 1a-continued

| Electrolyte | °C. | A/in$^2$ | mils | wt. loss % | Capacitance 10V | 30V |
|---|---|---|---|---|---|---|
| 3 | 39 | 2.4 | 2.72 | 38.0 | 259 | 84.7 |
| 3 | 36 | 2.4 | 2.80 | 32.5 | 247 | 86.3 |
| 4 | 39 | 2.4 | 2.80 | 32.0 | 255 | 87.0 |

The electrolytes used contained less than 1.0 M sodium chloride as at this concentration capacitance decreases. Table 1b gives the electrolyte concentration in moles/liter.

TABLE 1b

| Electrolyte | HCl | H$_3$PO$_4$ | AlCl$_3$ | NaCl |
|---|---|---|---|---|
| 1 | 1.0 | 0.11 | 0.40 | 0.085 |
| 2 | 1.4 | 0.11 | 0.40 | 0.085 |
| 3 | 1.4 | 0.20 | 0.26 | 0.34 |
| 4 | 1.4 | 0.20 | 0.26 | 0.68 |

EXAMPLE 2

Using magnesium chloride as the alkaline earth metal, temperature was varied from 35° to 42' C., frequency from 10 to 40 Hz, and current density from 1.9 to 2.9 A/in$^2$. Best results were obtained using 1.4 M hydrochloric acid, 0.3 M aluminum chloride, 0.2 M phosphoric acid, and 0.2 M magnesium chloride, 39° C., 25 Hz, and 2.4 A/in$^2$.

TABLE 2

| Final Thickness, mil | Wt. loss, % | Capacitance 10V | 30V |
|---|---|---|---|
| 2.82 | 31.0 | 256 | 83.8 |

In this example, potassium chloride is used as the alkali metal chloride. Representative results are shown below. Frequency was 20 Hz, and current density was 2.5 A/in$^2$. Electrolyte #5 contains 1.0 M hydrochloric acid, 0.4 M aluminum chloride, 0.11 M phosphoric acid, and 0.13 M potassium chloride. Electrolyte #6 contains 1.4 M hydrochloric acid and 0.25 M potassium chloride with the other amounts as in electrolyte #5.

TABLE 3

| Electrolyte | Temp. | Thickness | Wt. loss, % | Capacitance 10V | 30V |
|---|---|---|---|---|---|
| 5 | 34° C. | 2.72 | 37.4 | 161 | 54.0 |
| 5 | 37° C. | 1.73 | 38.1 | 188 | 64.0 |
| 6 | 34° C. | 2.70 | 39.5 | 238 | 69.1 |
| 6 | 37° C. | 1.90 | 43.4 | 118 | 24.6 |

Although the process conditions can be varied from 15 to 36 Hz, 30° to 45° C., and 1.0 to 3.0 A/in$^2$, the preferred ranges are 20 to 26 Hz, 35° to 40° C., and about 2.5 A/in$^2$. Similarly the electrolyte concentration can vary from 0.5 to 1.8 M hydrochloric acid, 0.05 to 0.3 M phosphoric acid, 0.2 to 0.5 M aluminum chloride, and 0.09 to 1.0 M alkali or alkaline earth metal chloride; the preferred composition is 1.4 M hydrochloric acid, 0.2 M phosphoric acid, 0.3 M aluminum chloride, and 0.1 to 0.7 M alkali or alkaline earth metal chloride.

What is claimed is:

1. A process for the AC electrolytic etching of aluminum capacitor foil comprising passing the foil between electrodes supplied with alternating current at a frequency of 15 to 36 Hz in a bath containing 0.5 to 1.8 M hydrochloric acid, 0.05 to 0.3 M phosphoric acid, 0.2 to 0.5 M aluminum chloride, and 0.09–1.0 M alkali or alkaline earth metal chloride at a temperature of 30° to 45° C.

2. A process according to claim 1 wherein the anodic current density is 1.0 to 3.0 A/in$^2$.

3. A process according to claim 2 wherein said anodic current density is 2.4 A/in$^2$.

4. A process according to claim 1 wherein said alkaline earth metal chloride is magnesium chloride.

5. A process according to claim 4 wherein the concentration of said hydrochloric acid is 1.4 M, the concentration of said phosphoric acid is 0.2 M, the concentration of said aluminum chloride is 0.3 M, the concentration of said magnesium chloride is 0.2 M, said temperature is 39° C. and said frequency is 25 Hz.

6. A process according to claim 1 wherein said alkali metal chloride is sodium chloride.

7. A process according to claim 6 wherein the concentration of said hydrochloric acid is 1.4 M, the concentration of said phosphoric acid is 0.2 M, the concentration of said aluminum chloride is 0.3 M, the concentration of said sodium chloride is 0.35 M, said frequency is 20 Hz, and said temperature is 39° C.

8. A process according to claim 1 wherein said alkali metal chloride is potassium chloride.

* * * * *